Patented Oct. 1, 1940

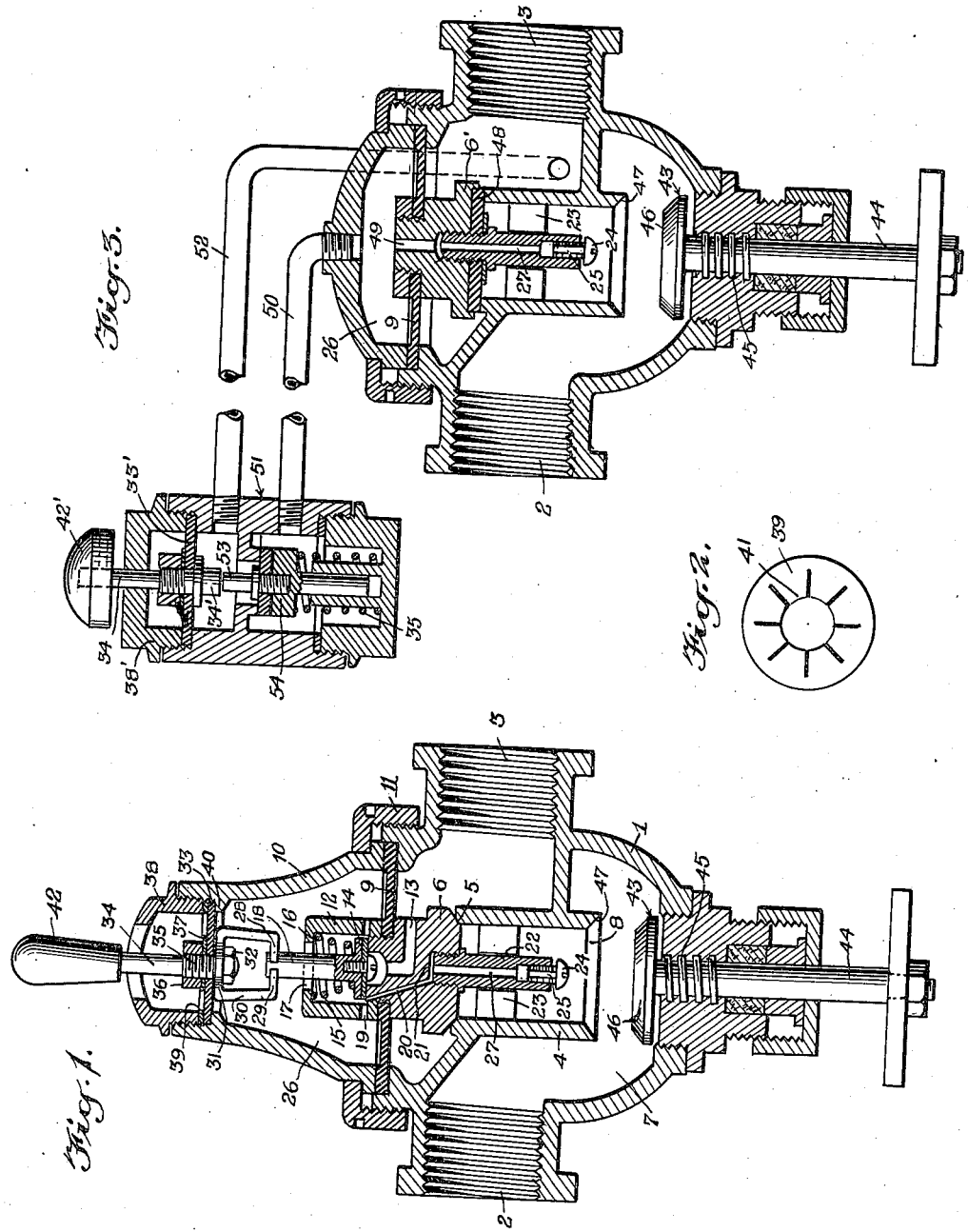

2,216,571

UNITED STATES PATENT OFFICE 2,216,571

FLUSH VALVE

Randolf A. Mikalsen, Brooklyn, N. Y.

Application July 13, 1939, Serial No. 284,236

4 Claims. (Cl. 137—93)

This invention relates to flush valves and has for an object to provide an improved construction wherein the parts may be readily adjusted to cause the valve to flush for different lengths of time.

Another object of the invention is to provide a construction wherein the automatic flush part of the valve may be readily shut off and removed for repairs or inspection.

A further object of the invention is to provide a flush valve wherein the parts may be actuated from a point adjacent the valve mechanism or at a remote point.

In the accompanying drawing—

Fig. 1 is a longitudinal vertical sectional view through a flush valve disclosing my invention;

Fig. 2 is a plan view of a spring washer shown in Fig. 1; and

Fig. 3 is a sectional view similar to Fig. 1 but disclosing a modified form of the invention capable of being actuated at a remote point.

Referring to the accompanying drawing by numerals, 1 indicates a valve casing having an inlet opening or port 2 and an outlet opening or port 3. Intermediate these ports there is arranged a tubular member 4 having a valve seat 5 against which the valve member 6 normally rests. The casing 1 is provided with a chamber 7 into which the water or other liquid moves and from this chamber the water moves upwardly through the bore 8 of the tubular member 4 provided the valve 6 is open. The valve 6 is carried by a flexible diaphragm 9 which may be rubber, metal, or other flexible material. The peripheral part of this diaphragm is clamped in place by the casing hood 10, which hood is clamped in place by a suitable nut 11. The inner part of the diaphragm 9 is clamped by a tubular nut 12. The valve 6 has a passageway 13 normally closed by an auxiliary tiltable valve member 14, which is normally held against its seat by a spring 15 acting against a shoulder 16. The tubular nut 12 has a large opening 17 for the reception of a valve rod 18, which is preferably integral with the upper part of the auxiliary valve member 14. Also nut 12 is provided with a number of ports 19 which are continually in free communication with a by-pass or leakage passageway 20. The passageway 20 merges into a tubular opening 21 into which a tubular member 22 is screwed. The tubular member 22 is held centrally not only by being screwed into the valve 6 but by the spider structure 23 formed integral with the tubular member 4. A screw 24 is threaded into the lower end of the tubular member 22 and provided with a flattened surface 25, whereby on an adjustment of this screw the amount of water passing from the passageway or bore 8 to the upper chamber 26 may be varied. If it should be desired to shut off the passage of all water from passageway 20, screw 24 could be tightened until the head thereof presses tightly against the end of tubular member 22. When the parts are arranged as shown in Fig. 1, the pressure of water in chamber 7 will cause water to pass along the flat portion 25, bore 27, passageway 20, and ports 19, into chamber 26 until the pressure in chamber 26 is the same as in chamber 7. This will cause the diaphragm 9 to maintain the valve 6 against its seat 5.

Arranged in the chamber 26 is a member 28 having forked arms 29 and 30 loosely engaging and partly surrounding the end portion of stem 18. The end 31 of member 30 is clamped by a nut 32 tightly against a resilient washer or diaphragm 33. A hand-actuated rod 34 is threaded at 35 so as to receive the nuts 32 and 36 to clamp the metal washer or gasket 37 tightly against the resilient diaphragm 33 and thereby cause the diaphragm to firmly press against the end 31 of member 30. A hollow nut 38 presses the gasket 39 against the peripheral part of the diaphragm 33 so as to clamp this diaphragm against the annular shoulder 40 and thereby make a tight connection. The gasket 37 is preferably of metal and is formed with resilient fingers 41, as shown in Fig. 2, so as to prevent the pressure of water in chamber 26 from causing the diaphragm 33 to move upwardly centrally. However, whenever the knob 42, mounted on the rod 34, is swung to one side in any direction, the diaphragm 33 will be tilted and will permit member 28 to tilt the rod 18, which in turn will tilt the auxiliary valve 14 against the action of spring 15. This will permit the passageway 13 to communicate with passageways 19 and also the interior of nut 12, whereby the pressure of water in chamber 26 will be relieved and this will result in the pressure of water against the valve 6 raising the valve 6. The valve 6 will immediately begin to close but will do so slowly and only in proportion to the amount of water passing through the leakage passageway 20. As soon as the pressure in chamber 26 has been fully restored, valve 6 will be pressed tightly against its seat 5.

In case it should be desired to remove or examine the valve 6 and associated parts, the water may be turned off by closing the lower auxiliary valve member 43, which is carried by the valve stem or rod 44. By reason of the threads 45, rod 44 may be rotated and moved longitudinally until the beveled part 46 on the valve member 43 is pressed tightly against the surface 47. This will prevent any water from passing into the passageway 8. Nut 11 may then be removed and the various parts in and above the tubular member 4 may be removed for examination, for repair, or replacement. After the parts have been reassembled the bottom auxiliary valve 43 is again moved to its lower position, as shown in Fig. 1, and the valve is in operative condition.

In Fig. 3 a slightly modified structure is shown which is principally identical with that shown in Fig. 1 but is provided with a remote control mechanism. The same reference numerals will be used in respect to Fig. 3 as are used in Fig. 1 except for the new and modified parts. As shown in Fig. 3, the valve member 6' is provided with a recess in which a washer 48 is mounted. Also valve 6' is provided with a straight passageway 49 instead of the inclined passageway 20. In this form of the invention, the chamber 26 is connected by a pipe 50 to a control device 51 and control device is connected through pipe 52 to an outlet port 3. When the parts are in the position shown in Fig. 3 the valve is closed but if the push button or knob 42' should be depressed the pressure in chamber 26 would be relieved and the valve 6' would open. Knob 42' is connected with the rod 34, which in turn is clamped to the diaphragm 33' held in place by the hollow nut 38'. When the knob 42' is depressed the enlargement 34' of shaft 34 will press against the pin 53 and as this pin is screwed into the valve structure 54, said valve structure will be lowered against the action of spring 55. In this form of the invention by holding the button 42' in its lowered position, the chamber 26 may be held continually in communication with the vent pipe or passageway 52 so that the valve continues to remain open. However, as soon as the button 42' has been released it will immediately move upwardly and spring 55 will almost immediately move the valve 54 to its closed position. This will close the outlet to chamber 26 and, consequently, as soon as the water passing through the passageway 49 has reestablished the pressure in chamber 26, valve 6' will close.

I claim:

1. A valve comprising a casing having a primary chamber in the lower part and inlet and outlet ports on opposite sides, means at the top of the casing forming an auxiliary chamber, a tubular member provided with a seat at its upper end, said tubular member being positioned with its axis extending at right angles to the axis of said inlet port and arranged between said inlet and outlet ports and extending from the upper part of said primary chamber, a hand-actuated valve member adapted to engage and disengage the lower end of said tubular member, a second valve member adapted to rest on said seat when the second valve member is closed, said second valve member having a bleeding passageway extending from the interior of said tubular member to said auxiliary chamber, means for varying the capacity of said bleeding passageway and a vent passageway, a flexible diaphragm connected to said second valve member dividing said auxiliary chamber from said outlet port acting to hold the second valve member in position to be moved toward and from said seat, a tiltable valve normally closing said vent passageway and hand-actuated means for tilting said tiltable valve for opening said vent passageway, whereby liquid from said auxiliary chamber may flow to said outlet port.

2. A valve comprising a casing having an inlet port and an outlet port, means including a tubular member open at both ends arranged between said ports, a valve member adapted to normally rest on one end of said tubular member for closing the same, a flexible diaphragm arranged at the top of said casing for holding said valve member so that it may be moved toward and from said tubular member, an auxiliary casing resting on the periphery of said diaphragm presenting a chamber above said diaphragm, said valve member having a restricted passageway between said tubular member and said chamber for directing fluid from said tubular member into said chamber to provide pressure on said diaphragm and valve member for holding said valve member against the end of said tubular member and against the action of fluid attempting to pass from said inlet port to said outlet port, said valve member also having a vent passageway leading from the top thereof to one side, said vent passageway being in constant communication with said outlet port, an auxiliary tubular member secured to said valve member at the bottom thereof, said auxiliary tubular member being in free communication with said restricted passage, manually adjustable means carried at the lower end of said auxiliary tubular member; for varying the amount of liquid flowing through said restricted passageway per second, a tiltable valve carried by said member positioned to normally close said vent passageway; and manually controlled means for tilting said tiltable valve for relieving the pressure in said chamber whereby the pressure of the incoming fluid will move said valve member off said tubular member and thereby permit fluid to flow from said inlet port to said outlet port.

3. A valve including a casing having an inlet port and an outlet port, means including a tubular member open at both ends providing a passageway between said ports, a metallic substantially cylindrical valve member resting on one end of said tubular member, said valve member having a restricted passageway extending therethrough for directing fluid from said tubular member to the opposite end of the valve member, a vent passageway leading from said opposite end to the outlet port, and a threaded extension, a flexible diaphragm surrounding said threaded extension, a hollow nut screwed onto said threaded extension for clamping said diaphragm to said valve member; whereby fluid passing through the first-mentioned passageway will produce a pressure on said valve member and said diaphragm to maintain said valve member closed, a tiltable spring-pressed valve member normally closing said vent and hand-actuated means for tilting said tiltable valve for unseating the same whereby the pressure on said diaphragm and one end of said valve member will be released so that fluid in said tubular member pressing on said valve member will unseat the same and flow to said outlet port.

4. A valve including a casing having an inlet port, an outlet port and a tubular member open at both ends positioned so that fluid passing from one port to the other must pass through said tubular member, a valve member positioned to close one end of said tubular member, said valve member having a restricted passageway leading from one end of the valve member to the other for directing liquid from said tubular member to the top of said valve member and a vent passageway leading from the top of said valve member to said outlet port, a diaphragm normally holding said valve member in position for closing said tubular member, means including said diaphragm forming a pressure chamber, said restricted passageway being in constant communication with said chamber whereby pressure will be built up in said chamber for holding said valve closed, a spring-pressed tiltable valve for normally closing said vent passageway, said tiltable valve having a valve rod, a hand-actuated tiltable handle, a flexible diaphragm for holding said handle in a given position and a member rigidily secured to said handle and loosely surrounding said valve rod whereby when said handle is tilted said rod will be swung to one side and said tiltable valve will be opened for exhausting liquid from said chamber.

RANDOLF A. MIKALSEN.